United States Patent
Kingston et al.

(10) Patent No.: US 7,179,193 B2
(45) Date of Patent: Feb. 20, 2007

(54) ARRANGEMENT FOR DRIVING A WHEEL OF A VEHICLE

(75) Inventors: Timothy Kingston, Eskilstuna (SE); Mats Åkerblom, Eskilstuna (SE)

(73) Assignee: Volvo Construction Equipment Components AB, Eskilstuna (SE)

( * ) Notice: Subject to any disclaimer, the term of this patent is extended or adjusted under 35 U.S.C. 154(b) by 0 days.

(21) Appl. No.: 10/709,480

(22) Filed: May 8, 2004

(65) Prior Publication Data

US 2005/0009663 A1    Jan. 13, 2005

Related U.S. Application Data

(63) Continuation of application No. PCT/SE02/01783, filed on Oct. 1, 2002.

(30) Foreign Application Priority Data

Nov. 8, 2001    (SE)    .................... 0103713

(51) Int. Cl.
F16H 3/44    (2006.01)
(52) U.S. Cl. .................... 475/327; 475/328; 180/369; 180/372
(58) Field of Classification Search ............... 475/323, 475/326–328, 331; 180/369, 370, 372
See application file for complete search history.

(56) References Cited

U.S. PATENT DOCUMENTS

| | | | |
|---|---|---|---|
| 3,115,204 A | | 12/1963 | Dence |
| 4,160,497 A | * | 7/1979 | Galicher .................... 192/221.1 |
| 4,317,498 A | * | 3/1982 | Jirousek et al. ............. 180/370 |
| 4,407,382 A | * | 10/1983 | Dziuba et al. ............... 180/10 |
| 4,646,880 A | | 3/1987 | Logan |
| 5,813,938 A | * | 9/1998 | Forster ........................ 475/331 |
| 6,090,006 A | | 7/2000 | Kingston |

FOREIGN PATENT DOCUMENTS

| | | | | |
|---|---|---|---|---|
| DE | 4010742 C1 | | 6/1991 | |
| JP | 03-164330 | * | 7/1991 | ................. 180/372 |

* cited by examiner

Primary Examiner—Ha Ho
(74) Attorney, Agent, or Firm—Novak Druce & Quigg, LLP

(57) ABSTRACT

Method and arrangement for driving a wheel of a vehicle in which the arrangement includes a planetary gear transmission (6) which in turn has a sun gear (7) connected to a driving axle (4), a planet carrier (11) on which at least one planet gear (8) is arranged and the planet gear is also arranged in engagement with the sun gear (7), and a ring gear (9) arranged around, and also in engagement with the planet gear. The driving arrangement also includes a braking device (16) and a wheel hub (12), which hub is connected to the planet carrier (11). The braking device is adapted to brake the planet carrier relative to a static part (18) arranged outside the planet gear carrier in the radial direction. The ring gear (9) and the outer, static part (18) are constructed in one piece in the form of an annular member (20).

15 Claims, 1 Drawing Sheet

ARRANGEMENT FOR DRIVING A WHEEL OF A VEHICLE

CROSS-REFERENCE TO RELATED APPLICATIONS

The present application is a continuation patent application of International Application No. PCT/SE02/01783 filed Oct. 1, 2002 which was published in English pursuant to Article 21(2) of the Patent Cooperation Treaty, and which claims priority to Swedish Application No. 0103713-4 filed Nov. 8, 2001, Both applications are expressly incorporated herein by reference in their entireties.

TECHNICAL FIELD

The present invention relates to an arrangement for driving a wheel of a vehicle. More particularly, the invention is directed toward an arrangement that includes a planetary gear transmission having a sun gear connected to a driving axle. A planet carrier is included upon which at least one planet gear is arranged. The planet gear is arranged in engagement with the sun gear, and a ring gear is arranged around, and also in engagement with, the planet gear. A braking device and a wheel hub are also provided. The hub is connected firmly to the planet carrier and the braking device is adapted to brake the planet carrier relative to a static part arranged outside the planet carrier in the radial direction.

The invention can be applied in vehicles which are intended to be driven on a relatively flat surface, such as a road, and/or on uneven ground in the country.

The invention is especially applicable to vehicles such as construction equipment pieces (machines) such as wheel loaders, articulated or frame-steered vehicles (what is known as a dumper), and also more traditional land vehicles, such as trucks.

Such a driving arrangement is usually provided at a wheel arranged at each end of a driving axle, and the gear itself is usually referred to as a hub reduction gear. The driving axle typically is in two parts, and the parts are connected centrally by a differential gear.

BACKGROUND ART

U.S. Pat. No. 6,090,006 describes a driving arrangement comprising (including, but not limited to) a planetary gear transmission. A sun gear of the planetary gear transmission is driven by a driving axle. A number of planet gears are arranged between, and in engagement with the sun gear and an outer ring gear.

A planet carrier is connected to the planet gears. The ring gear is in turn connected to a pressure plate of a friction brake. The friction brake is arranged so as to brake the planet carrier in relation to an outer, static part. The brake is therefore arranged outside the planet carrier in the radial direction. Inward in the radial direction, the planet carrier is also connected to a portion of a hub via splines. The hub portion is arranged on the inside of, and mounted on the outer static part via two roller bearings. The hub extends outward in the axial direction from the ring gear, and a hub portion on an outer side of the roller bearings is intended to carry the wheel.

DISCLOSURE OF INVENTION

One object of the invention is to provide a driving arrangement which is more cost-effective to produce in relation to that which has been previously known. Production according to the present invention includes more cost-effective manufacture and/or less time-consuming assembly. The invention also aims to achieve a driving arrangement that affords opportunities for a reduction of the number of component parts in the arrangement and/or a weight reduction.

This object is achieved by virtue of the fact that the ring gear and the outer, static part are designed in one piece in the form of an annular member.

According to a preferred embodiment of the invention, the braking device and the hub are arranged on the planet carrier on different sides of the planet gear.

In this way, opportunities are afforded for producing a device which is compact; that is to say, requires less space in the axial direction than traditional constructions.

According to another preferred embodiment of the invention, the hub is mounted against the annular member and, to be precise, the hub is mounted against the annular member, outside, in the radial direction—that portion of the annular member that forms the ring gear, and also against that portion. In this way, opportunities are afforded for a device which is compact (requires less space) with respect to the axial direction.

According to another preferred embodiment of the invention, the bearing arrangement between the hub and the gearwheel comprises at least one row of balls arranged along a circular track and also between races designed in the hub and the ring gear. By virtue of such an arrangement, opportunities are afforded for a device that is cost-effective from the point of view of production, and compact in the axial direction.

Further preferred embodiments and advantages of these emerge from the included description.

BRIEF DESCRIPTION OF THE DRAWINGS

The invention will be described in greater detail below with reference to the embodiment shown in the accompanying drawing, and in which.

MODE FOR THE INVENTION

Figure 1:
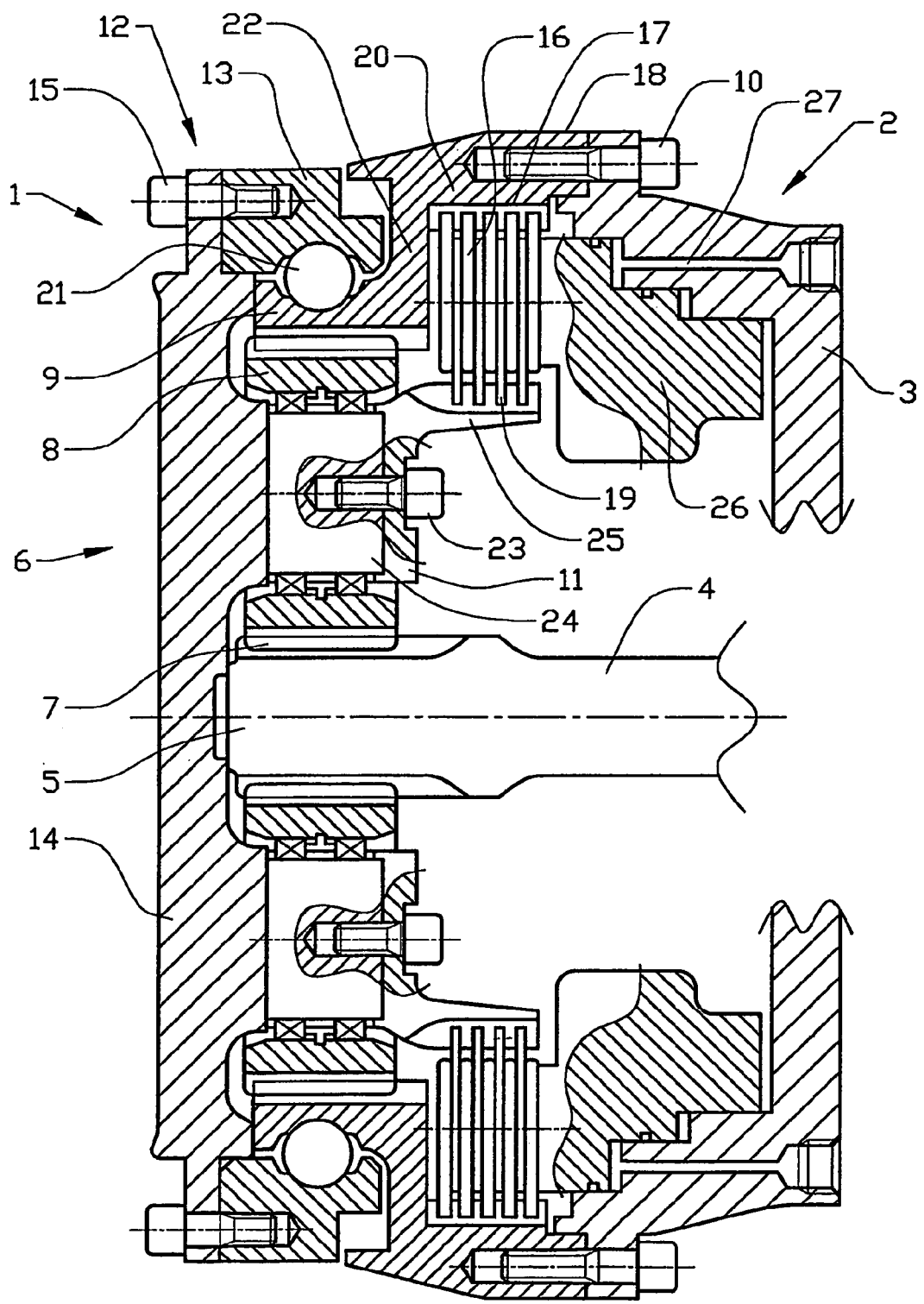
FIG. 1 is a schematic diagram, shown as a partly cut-away side view of the driving arrangement.

FIG. 1 shows a driving arrangement 1 in a diagrammatic side view. The driving arrangement 1 is arranged at one end of the axle case 3 of a wheel axle 2. A driving axle 4 extends inside the axle case 3. The driving axle 4 is, at one of its ends 5, provided with a hub reduction gear 6 in the form of a planetary gear transmission. At its other end, the driving axle 3 is operationally connected to a central gear (not shown) which, via a drive shaft, is driven by the engine of the vehicle. According to conventional designs, the planetary gear transmission 6 comprises a sun gear 7, a number of planet gears 8 and a ring gear 9 which are arranged in driving interconnection via teeth. The ring gear 9 is connected firmly to the axle case 3 via screw joints 10. A planet carrier 11, also known as a planet gear holder, is adapted so as to hold the planet gears 8. To be precise, the planet gears 8 are mounted on the planet carrier 11. The number of planet gears 8 in the preferred embodiment is three; but, it is contemplated that devices will fall within the scope of the present invention regardless of the number of planet gears which can be one, two, three, four and more.

A hub 12, intended to carry a wheel (not shown), is mounted outside the ring gear 9 in the radial direction, and also against it. The wheel hub 12 is also connected fixedly to the planet carrier 11 against relative movement therebetween. In the illustrated exemplary embodiment, the hub comprises an annular part 13 and a disk-shaped cover 14 connected firmly to the annular part 13. The annular part 13 is arranged outside the ring gear in the radial direction and is also mounted thereagainst. The annular part 13 and the disk-shaped cover 14 are interconnected firmly via screw joints 15.

The cover 14 is arranged outside the planetary gear transmission 6 in the axial direction and protects the latter from the external environment. The hub 12, and to be more precise, the cover 14 is connected firmly to the planet carrier 11. The wheel is fastened by a conventional fastening device (not shown) on the hub 12, usually a bolt joint.

The driving arrangement also comprises a braking device 16. The braking device 16 is configured as a wet brake in the form of a multiple-disk brake. The braking device 16 comprises two sets of brake disks that rotate in relation to one another during operation. A first set of brake disks is connected to a static part 18 arranged outside the planet carrier 11 in the radial direction. The connection consists of a spline joint 17. A second set of brake disks is connected to the planet carrier 11. The connection consists of a spline joint 19. The brake disks are displaceable in the axial direction on the spline joints 17, 19. In a conventional manner, the brake disks belong alternately to the first set and to the second set. The planet carrier 11, which is connected firmly to the hub 12 and thus has the same speed as the wheel during operation, is in this way braked against the static part 18.

The braking device 16 also comprises a brake piston 26 for applying the brake by pressing the brake disks together and thus increasing the friction between them.

A duct 27 is provided to supply oil for applying the brake and is coupled to the brake piston. On an opposite side of the brake disks relative to the brake piston 26, the annular member 20 forms a pressure surface, or stay, against which the disks are brought into contact with when the brake is applied.

By means of this type of braking device 16, the wheel is braked directly. By virtue of the fact that the wheel is braked directly—that is to say, the braking takes place after the planetary gear transmission 6, a part is braked which has a lower rotation speed relative to the driving axle (the driving axle usually has a speed which is approximately six times higher than that of the wheel). In this way, it is possible to obtain very good adjustability of the braking, which is especially advantageous for application in vehicles which require great braking power within a large speed range. Exemplary incorporating vehicles include, for example, dumpers, other types of construction equipment and overland vehicles.

The ring gear 9 and the outer, static part 18 are designed in one piece in the form of an annular member 20. In other words, the ring gear 9 and the outer, static part 18 are integrated in the annular member 20.

The annular member 20 has a number of functions including: acting as a holder for the planetary gear transmission 6, which is to say, the member 20 is connected firmly to the axle case 3; acting as a brake housing for the braking device 16; and acting as a bearing unit 21 for mounting the wheel hub 13. The annular member 20 can be described as comprising a first annular portion 9, in the form of the ring gear, that is arranged in a first position in the radial direction. The annular member 20 also includes a second portion 18, in the form of the outer, static part, that is arranged in a second position at a greater distance in the radial direction than the first portion. The annular member 20 also comprises a portion 22 which lies between the first and second portions and forms the pressure surface for the brake disks, which intermediate portion 22 extends in the radial direction and connects the ring gear 9 and the outer, static part 18.

The bearing arrangement 21 between the hub 13 and the ring gear 9 comprises a row of a number of balls arranged along a circular track between races designed in the hub 13 and the ring gear 9. Such a bearing arrangement is often referred to as a four-point bearing due to the fact that four surfaces are ground for contact with the balls. In order to form the bearing arrangement, a number of balls are therefore mounted in between the ring gear 9 and the hub 13. In other words, there is no conventional ball bearing between the parts. In the instant context, the term "race" is utilized to mean that a surface area is designed for receiving the balls. This surface area usually has a curved or angled shape.

The member 20 which comprises the ring gear 9 and the outer, static part 18 has been described as "annular" and should be taken in a wide sense in that the term, as utilized herein, includes various forms of at least essentially circular structures that are continuous in the peripheral direction.

The braking device 16 and the hub 13 are arranged on different sides of the planet gears 8. More precisely, the braking device 16 is arranged on the planet carrier 11 for direct braking thereof relative to the annular member 20. The hub 13 is in turn connected firmly to the planet carrier 11. The planet gears 8 are mounted on pivots 24 which project from the disk-shaped cover 14. That part 25 of the planet carrier 11 which forms the brake housing is connected to the pivots 24 via screw joints 23. According to an alternative embodiment, the planet carrier part 24 and the brake housing part 25 are formed in one piece.

The invention is not to be regarded as being limited to the illustrative embodiments described above, but a number of further variants and modifications are conceivable and contemplated to be within the scope of the patent claims. For example, application or utilization of the arrangement may differ, or the engine of the vehicle may be arranged so as to drive the driving axle 4 directly, that is to say without an intermediate drive shaft and central gear.

FIG. 1 shows the bearing arrangement in the form of a row of balls which are received in races in the hub and the ring gear. Alternatively, it is possible to utilize a number of rows of balls, which rows are arranged with a mutual spacing in the axial direction. This type of bearing arrangement is usually referred to as an angular contact bearing. According to another alternative, other types of bearing arrangements can be used, such as roller bearings and, in particular, conical roller bearings.

The invention claimed is:

1. An arrangement for driving a wheel of a vehicle, said arrangement comprising:

a planetary gear transmission including a sun gear connected to a driving axle, a planet carrier on which at least one planet gear is arranged in engagement with the sun gear, and a ring gear arranged around and in engagement with said at least one planet gear;

said ring gear and an outer, static part are of one piece construction and form an annular member;

a braking device and a wheel hub, said wheel hub being fixedly connected to the planet carrier and the braking device being arranged to brake the planet carrier relative to the static part that is arranged outside the planet carrier in the radial direction; and a bearing arrangement provided between the hub and the annular member which comprises at least one row of balls arranged along a circular track established between races provided in the hub and the annular member and wherein the race provided in the hub is located radially outside the race provided in the annular member and wherein said hub has an annular part fixedly interconnected to a cover disk, said ring gear having an edge portion including a lip and a groove, said annular part received in said groove to overlap said lip of said ring gear.

2. The arrangement as recited in claim 1, wherein the braking device and the hub are arranged on the planet carrier on different sides of the planet gear.

3. The arrangement as recited in claim 1, wherein the hub is mounted against the annular member outside in the radial direction of that portion of the annular member which forms the ring gear, and also against said portion.

4. The arrangement as recited in claim 1, wherein the bearing arrangement between the hub and the annular member further comprises two rows of balls arranged at a mutual spacing in the axial direction of the driving axle.

5. The arrangement as recited in claim 1, wherein the annular member forms a pressure surface for said braking device.

6. The arrangement as recited in claim 1, wherein the outer, static part forms a portion of a brake housing for the braking device.

7. The arrangement as recited in claim 1, wherein the annular member is connected firmly to an axle case.

8. The arrangement as recited in claim 1, wherein the braking device comprises at least one first brake disk, which is connected to the planet carrier, and at least one second brake disk, which is connected to the static part, and a pressure applicator that applies a pressure for the purpose of pressing the first and second brake disks together when braking takes place.

9. The arrangement as recited in claim 1, wherein said annular part includes a rim received for rotation in said groove.

10. The arrangement of claim 1, wherein said cover disk has a plane parallel to a plane formed by said circular track adjacent thereto.

11. A driving arrangement comprising:

an annular member, fixedly connected to an axle case, said annular member including a first portion integrally formed with a second portion joining said first portion to a third portion of said annular member, said first portion connected to said axle case, said second portion providing a pressure surface for a multiple disk brake, said third portion forming a ring gear having an outer surface;

a hub including a disk shaped cover attached to an annular part that overlaps at least a portion of said outer surface;

a planetary gear transmission comprising a sun gear, a plurality of planet gears and said ring gear;

a carrier for said plurality of planet gears, said carrier firmly connected to said hub for rotation therewith; and a driving axle having a first end and a second end, said first end including said sun gear to engage said plurality of planet gears, said driving axle driven by a vehicle engine having connection to said second end for rotation of said sun gear to cause a rate of rotation of said hub and said carrier, said multiple disk brake when pressed against said pressure surface reducing said rate of rotation by increasing friction between a first set of brake disks connected to said first portion of said annular member and a second set of brake disks connected to said carrier.

12. The arrangement as recited in claim 11, wherein said second portion has an orthogonal relationship to each of said first portion and said third portion.

13. The arrangement as recited in claim 12, wherein said ring gear has an edge portion including a groove adjacent to said outer surface, said annular part received in said groove to overlap said outer surface of said ring gear.

14. The arrangement as recited in claim 11, including a a bearing arrangement provided between the outer surface and the annular part, said bearing arrangement comprising at least one row of balls arranged along a circular track established between races provided in the annular part and the outer surface.

15. The arrangement as recited in claim 14, wherein said disk shaped cover has a plane parallel to a plane formed by said circular track adjacent thereto.

* * * * *